B. D. EMANUEL.
COMBINED SPEEDOMETER AND SPEED CONTROLLER.
APPLICATION FILED JAN. 24, 1913.
1,127,607.
Patented Feb. 9, 1915.
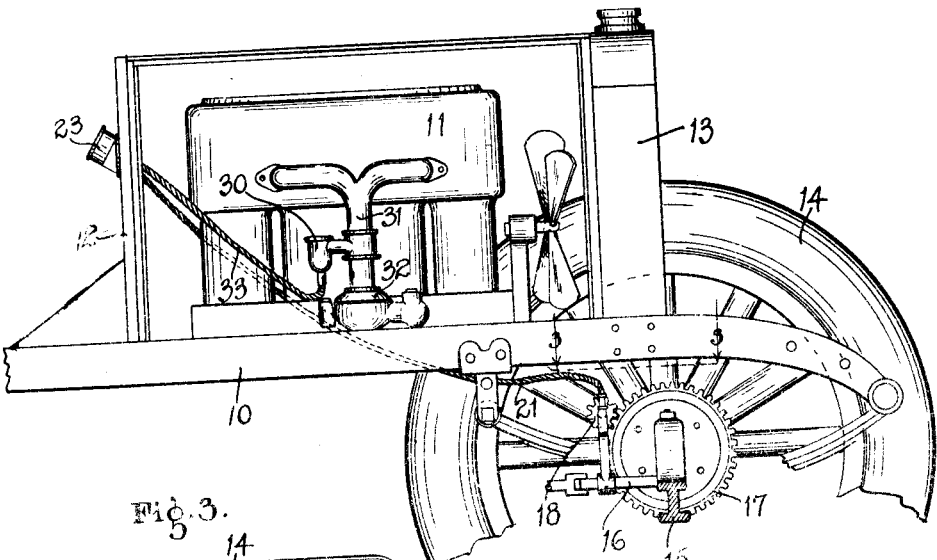
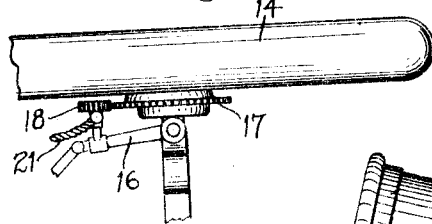
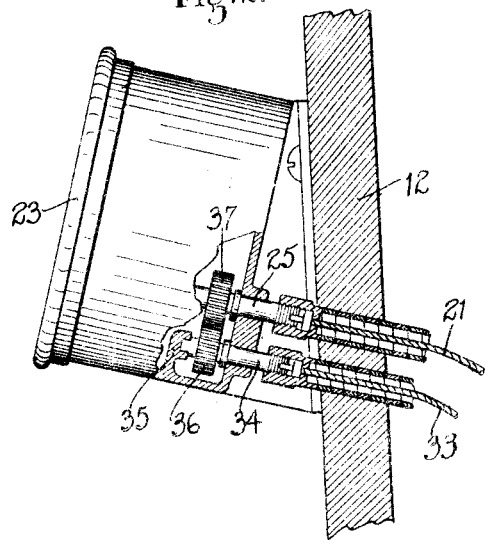
WITNESSES:
INVENTOR
BENJAMIN D. EMANUEL
BY
ATTORNEY

UNITED STATES PATENT OFFICE.

BENJAMIN D. EMANUEL, OF HAMILTON, OHIO, ASSIGNOR TO THE PIERCE SPEED CONTROLLER COMPANY, OF ANDERSON, INDIANA, A CORPORATION.

COMBINED SPEEDOMETER AND SPEED-CONTROLLER.

1,127,607.          Specification of Letters Patent.          Patented Feb. 9, 1915.

Application filed January 24, 1913. Serial No. 743,923.

*To all whom it may concern:*

Be it known that I, BENJAMIN D. EMANUEL, a citizen of the United States, and a resident of Hamilton, county of Butler, and State of Ohio, have invented a certain new and useful Combined Speedometer and Speed-Controller; and I do hereby declare that the following is a full, clear, and exact description thereof, reference being had to the accompanying drawings, in which like letters refer to like parts.

The object of this invention is to improve the operation and construction of speedometers and speed controllers for and in connection with automobiles or other cars or vehicles. By "speedometer" is meant herein any device for indicating either the speed or the mileage, or both, and the invention is not limited to any particular type or construction of speedometer or odometer or speed controller. By "speed controller" is meant, as used herein, any automatic means arranged to limit the speed at which an automobile or the like can be driven.

The chief feature of the invention consists in driving one of said parts, the speedometer and the speed controller, from the other and preferably in driving the speed controller from the speedometer. Thus, with this arrangement said two parts or mechanisms are associated together mechanically so that the operation of one controls the operation of the other. As long as the speedometer operates, the speed controller will likewise be in operation and one cannot stop the operation of one of said parts without stopping the other. Therefore, the speed controller is desired often by the owner of an automobile to prevent an automobile from being driven by a chauffeur or any one else at too high speed. If the arrangement be such, however, that the chauffeur could readily disengage the speed controller or the speedometer then he could be relieved from the limitation of the speed controller. Furthermore, the practical device herein shown has the advantage of the speed controller being driven directly by the speedometer, or the two driven by the same means so that there is a fixed relation between the action of the speed controller and the operation of the speedometer.

The nature of the invention will be understood from the accompanying drawings and the following description and claims.

In the drawings, Figure 1 is a side elevation of the front portion of an automobile equipped with my invention, parts being broken away. Fig. 2 is a vertical section through the dash at the point where the speedometer is mounted, parts being broken away. Fig. 3 is a plan view from the line 3—3 of Fig. 1, parts being broken away.

There is shown herein to illustrate one possible form of this invention, a chassis 10 of an automobile having an engine 11, dash 12, radiator 13, front wheel 14, axle 15 and steering arm 16. Associated with the wheel there is a gear 17 which drives a pinion 18 mounted on a bracket 20 extending from the steering arm 16 for driving a flexible shaft 21 which, in the construction which is shown, runs to the speedometer 23 which is secured on the rear side of the dash 12, as shown in Figs. 1 and 2. There is a shaft 25 in the speedometer which is driven by the flexible shaft and it operates or drives the speedometer. The particular internal mechanism of the speedometer is not shown and constitutes no particular part of this invention and whether the device is an odometer for registering mileage or a speed indicator is immaterial.

There is shown a speed controller 30 associated with the intake 31 leading from the carbureter 32 to the engine cylinders. It is immaterial as to how the speed controller is constructed, internally or otherwise, or whether it be associated with the intake or with the carbureter. The speed controller herein is driven by a flexible shaft 33 which is operably connected with a shaft 34 in the speedometer parallel with the shaft 25 and having its bearing in the end 35 and carrying a gear 36 meshing with a gear 37 on the shaft 25 which operates a speedometer. Therefore, in the mechanism herein shown the speed controller is driven by the speedometer. It can also be said that the speedometer and speed controller are driven by the same means, namely, the flexible shaft 21, as that shaft, through shaft 25, gear 37, gear 36, shaft 34 and flexible shaft 31, drives the speedometer.

Herein the speedometer is shown driven from the wheel of the automobile through the flexible shaft 21, but the invention is not limited to the particular means for driving or operating the speedometer or speed controller, whichever is driven directly from the other mechanism of the automobile. One of these members can, instead of being driven from the wheel of the automobile, be driven from the engine shaft, as the said parts are in the form shown indirectly driven by the engine. The speed controller acts upon and through the engine for limiting the speed of the engine, as well as the vehicle.

The invention is not limited to the details of construction herein shown as what is shown is merely to illustrate the general nature of the invention, nor is it limited to any particular type of automobile or engine or speedometer or speed controller, but it is intended to be employed in connection with any type of any of said parts.

I claim as my invention:

1. The combination with a power driven vehicle having traction wheels, of a speedometer, a flexible shaft driven by a traction wheel of the vehicle for operating the speedometer, a speed regulator, and a connection between the speedometer and speed regulator operated by means in the speedometer for operating the speed regulator.

2. The combination with a power driven vehicle, of a speedometer operated by the vehicle, a speed controller, and means within the speedometer in constant operative engagement for actuating the speed controller from the speedometer.

3. The combination with a power driven vehicle, of a speedometer, a flexible shaft driven by the vehicle, a shaft in the speedometer operated by said flexible shaft and for driving the speedometer, a parallel shaft in the speedometer, a pair of meshing gears on the parallel shafts in said speedometer, a speed controller, and a flexible shaft extending from the driven shaft in the speedometer to the speed controller for operating it.

In witness whereof, I have hereunto affixed my signature in the presence of the witnesses herein named.

BENJAMIN D. EMANUEL.

Witnesses:
 JAMES D. HOPPER,
 WALTER J. SKEHAN.